(12) United States Patent
Kanno (10) Patent No.: US 6,346,958 B2
(45) Date of Patent: Feb. 12, 2002

(54) METHOD FOR DETECTING QUANTITY OF LASER SCANNING POSITIONAL DEVIATION ON PHOTOSENSITIVE BODY, CORRECTING METHOD THEREOF AND LASER COLOR IMAGE FORMING APPARATUS

(75) Inventor: Hiromasa Kanno, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/760,669

(22) Filed: Jan. 17, 2001

(30) Foreign Application Priority Data

Jan. 24, 2000 (JP) .................................... 2000-014368

(51) Int. Cl.⁷ .............................................. G03G 15/01
(52) U.S. Cl. ...................................... 347/116; 347/234
(58) Field of Search ................................ 347/116, 234, 347/235, 248, 249, 250; 399/301

(56) References Cited

U.S. PATENT DOCUMENTS

| 6,100,907 | A | * | 8/2000 | Uffel | 347/133 |
| 6,144,393 | A | * | 11/2000 | Kwak | 347/116 |
| 6,160,566 | A | * | 12/2000 | Maeda | 347/234 |
| 6,166,749 | A | * | 12/2000 | Lee | 347/116 |
| 6,198,490 | B1 | * | 3/2001 | Eom et al. | 347/116 |

FOREIGN PATENT DOCUMENTS

| JP | 61-162023 | | 7/1986 |
| JP | 62-253115 | | 11/1987 |
| JP | 63-175817 | | 7/1988 |
| JP | 3-110512 | | 5/1991 |
| JP | 4-335665 | * | 11/1992 |
| JP | 9-109453 | * | 4/1997 |
| JP | 11-157134 | | 6/1999 |

* cited by examiner

Primary Examiner—Joan Pendegrass
(74) Attorney, Agent, or Firm—Young & Thompson (57) ABSTRACT

A laser color image forming apparatus uses a plurality of laser beams, forms a latent image on a photosensitive belt by laser scanning having a fixed scanning frequency and a pixel forming clock frequency within one scanning, develops the latent image on the photosensitive belt by toner absorption using toner of a color corresponding to each laser beam, and then transfers the developed image to a printing medium such as a paper sheet or the like. Regarding image patterns for the detection of positional deviation, specifically designed to detect the quantity of printing positional deviation of a color to be measured, zonal patterns arrayed on a fixed cycle for a reference color and zonal patterns having shapes similar to the former and designed for the color to be measured are superposed to form a plurality of image patterns on the photosensitive belt. For the respective image patterns, the zonal patterns for the reference color and the color to be measured are shifted from each other based on the mutually different quantities of deviation. The reflection density of each image pattern is measured, and an image pattern having a minimum reflection density is detected. Based on the quantity of deviation of this detected pattern, the quantity of printing positional deviation of the color to be measured is detected. To eliminate the printing positional deviation, based on the detected quantity of printing positional deviation, the scanning start timing of laser scanning and the pixel forming clock frequency are changed.

20 Claims, 9 Drawing Sheets

METHOD FOR DETECTING QUANTITY OF LASER SCANNING POSITIONAL DEVIATION ON PHOTOSENSITIVE BODY, CORRECTING METHOD THEREOF AND LASER COLOR IMAGE FORMING APPARATUS

BACKGROUND OF THE INVENTION

1. Field of the Invention

The present invention relates to a method for detecting a quantity of laser scanning positional deviation on a photosensitive body, a method for correcting scanning positional deviation, and a laser color image forming apparatus using a plurality of laser beams, which is provided with such methods.

2. Description of the Related Art

Figure 9:
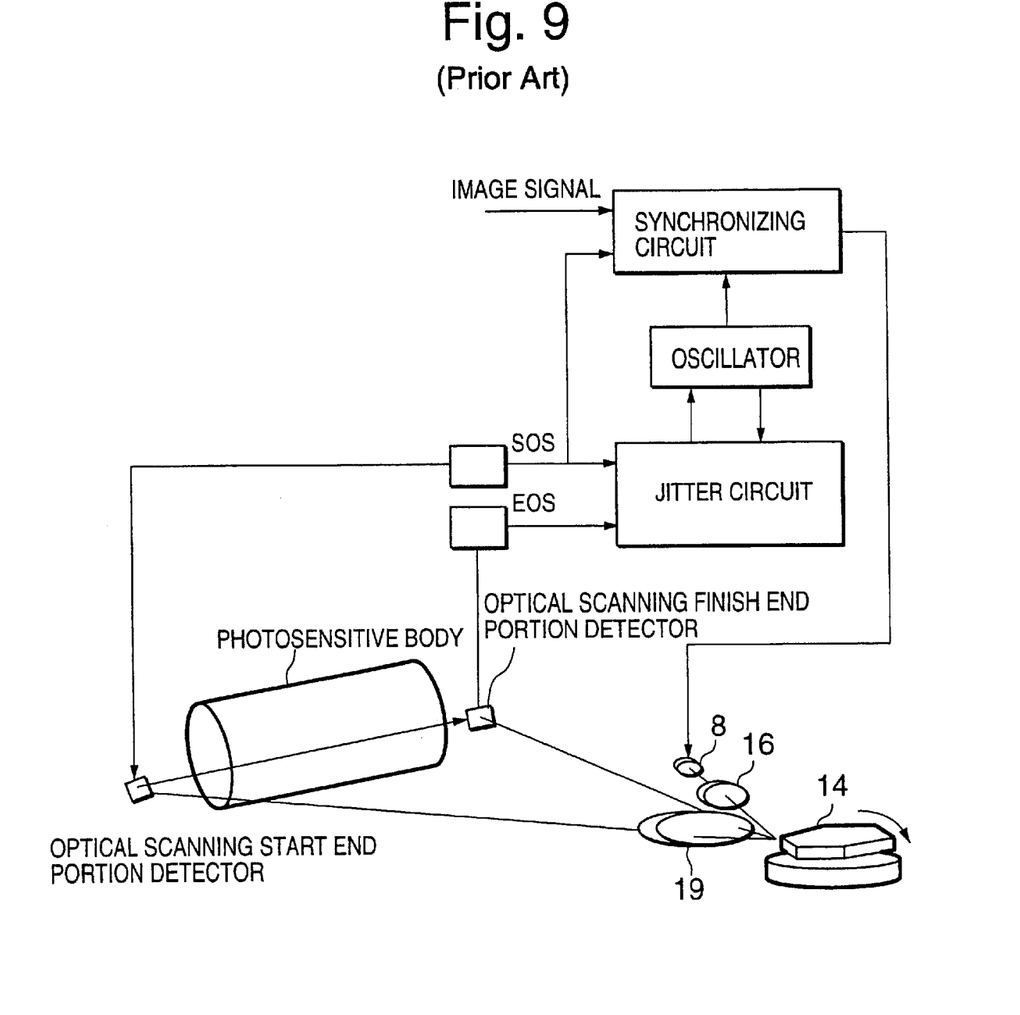
FIG. 9 is a view illustrating a constitution of means for correcting fluctuation in a laser beam scanning velocity in a conventional laser printer.

Heretofore, in a color image forming apparatus using a plurality of laser beams and an electrophotographic photosensitive body, a difference in distance has been generated by an attaching error, temperature fluctuation, and the like between a laser scanner unit and a photosensitive belt among colors, causing variance in laser beam scanning velocities on the photosensitive belt. Consequently, color shifting has occurred in a formed color image. In a monochromatic image forming apparatus using laser beams and an electrophotographic photosensitive body, as methods for solving such a problem of fluctuation in the laser beam scanning velocity, Japanese Patent Laid-Open No. 63 (1988)-175817, Patent Laid-Open No. 62 (1987)-253115, Patent Laid-Open No. 3 (1991)-110512, and Patent Laid-Open No. 61 (1986)-162023, and the like, discloses technologies. A basic principle of the methods provided by any of these technologies is as follows. That is, as shown in FIG. 9, photodetection sensors are provided, one each, in the start and finish end portions of a laser beam, a scanning velocity is obtained from the time of laser beam scanning between the photodetection sensors, the scanning velocity is fed back to a pixel clock frequency, and then the pixel clock frequency is corrected.

However, there are two significant drawbacks when the above methods are applied to a color printer using a plurality of laser beams.

First, the attaching positions of the sensors must be completely identical among colors. Such setting is very difficult, and thus impractical. Second, the methods are advantageous only when the scanning velocity is uniformly shifted without any dependence on a scanning position on the photosensitive body, in other words, only when a positional relation between a laser optical system and the photosensitive body is shifted in parallel to a scanning direction. The methods are ineffective for a positional change which changes the velocity depending on a scanning position, or the like.

Because of such drawbacks, the color shifting inevitably occurs in an image of each color formed on the photosensitive body.

With regard to a method for detecting the quantity of printing positional deviation in an electrophotographic LED color printer, a technology is disclosed in Japanese Patent Laid-Open No. 11 (1999)-157134. According to the method provided by this technology, a laser device, a condenser optical system, and an image-forming optical system, which are all dedicated to the detection, are required for detecting a printing positional deviation detection pattern of each color developed on the photosensitive body. Thus, costs are inevitably high. Further, to increase detecting resolution, a condensing spot is stopped down to about several tens of $\mu$m. This necessitates an adjustment also in a detecting system, causing temperature fluctuation, fluctuation with time, and other problems in the detecting system itself.

SUMMARY OF THE INVENTION

As regards a color image forming apparatus using a plurality of laser beams and an electrophotographic photosensitive body, the object of the invention is to provide a method and an apparatus for solving the problem that a difference in distance has been generated by an attaching error, temperature fluctuation, and the like between a laser scanner unit and a photosensitive belt among colors, causing variance in laser beam scanning velocities on the photosensitive belt and consequently, color shifting has occurred in a formed color image.

Regarding a laser color image forming method for developing a latent image formed on an electrophotographic photosensitive belt by laser scanning having a fixed scanning frequency and a pixel forming clock frequency within one scanning by toner absorption, and then transferring the developed image to a printing medium, that is, a paper sheet, and in a method using a plurality of laser beams and a plurality of toner colors, a method of the invention is provided for detecting the quantity of laser scanning positional deviation on the photosensitive belt.

This method comprises the steps of:

setting a plurality of zonal patterns formed by toner development on the photosensitive belt for optional one among a plurality of colors and arrayed on a fixed cycle as image patterns for detection of a printing positional deviation of a reference color, setting image patterns having shapes similar to those of the image patterns for the detection of the printing positional deviation of the reference color and designed for the detection of the printing positional deviation of other colors as image patterns for the detection of the printing positional deviation of a color to be measured, spatially shifting the image patterns for the detection of the printing positional deviation of the color to be measured from the image patterns for the detection of the printing positional deviation of the reference color, and varying the quantity of spatial shifting for each of the plurality of the image patterns for the detection of the printing positional deviation of the reference color, thus forming the image patterns in a superposed state on the photosensitive belt;

measuring reflection densities of the plurality of image patterns formed in the superposed state for the detection of the printing positional deviation;

detecting a group having said minimum reflection densities among the plurality of the image patterns formed in the superposed state for the detection of the printing positional deviation; and detecting the quantity of the deviation between a laser scanning position of the reference color and a laser scanning position of the color to be measured based on the quantity of shifting given when the detected group of image patterns for the detection of the printing positional deviation is formed by being superposed on the color to be measured.

In this case, the image patterns for the detection of printing positional deviation of the reference color and the color to be measured are formed in three places including a scanning start end portion, a scanning central portion and a scanning finish end portion of a laser scanning direction on the photosensitive belt.

Moreover, the image patterns for the detection of printing positional deviation of the reference color and the color to be measured are constituted of image patterns for detecting printing positional deviation in the laser scanning direction on the photosensitive body, and for detecting printing positional deviation in a sub-scanning direction orthogonal to the laser scanning direction.

Furthermore, the number of other colors is three, and the quantities of deviation with respect to a laser scanning position of the reference color are detected for each of the three colors.

In addition, the three colors are all developed by a toner color similar to that for the reference color.

Furthermore, the measured reflection densities of the image patterns for the detection of printing positional deviation are obtained from an irradiating light used to irradiate the plurality of zonal patterns arrayed on the fixed cycle constituting the image patterns for the detection of printing positional deviation.

DETAILED DESCRIPTION OF THE PREFERRED EMBODIMENTS

Figure 1:
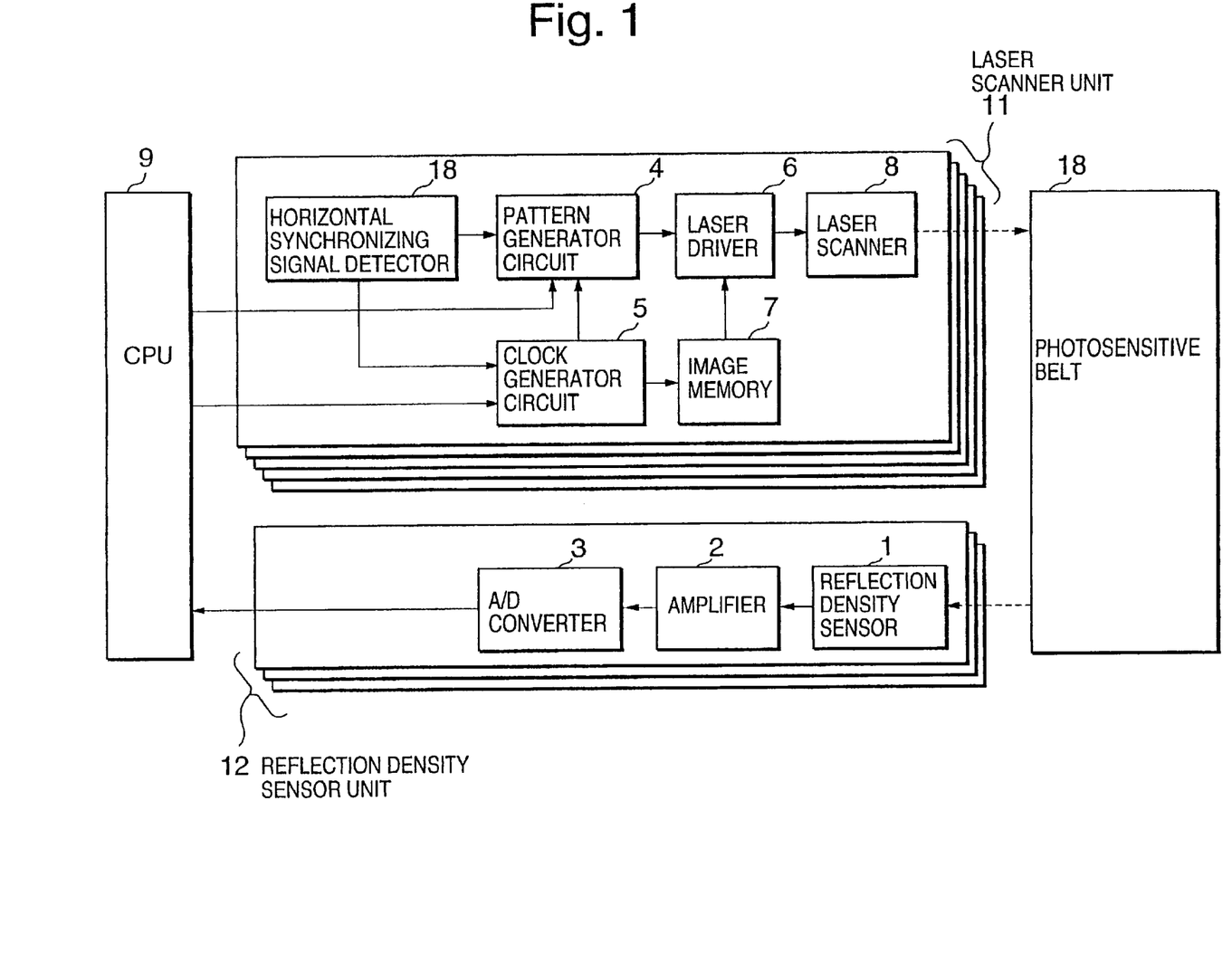
FIG. 1 is a block diagram showing an entire constitution of a color image forming apparatus according to a first embodiment of the present invention.

The preferred embodiments of the present invention will be described in detail with reference to the accompanying drawings. FIG. 1 is a block diagram showing an entire constitution of a color image forming apparatus according to a first embodiment of the present invention. This color image forming apparatus comprises: a processor CPU 9 for controlling the entire apparatus; a laser scanner unit 11 corresponding to each of four colors; a photosensitive belt 10; and a plurality of reflection density sensor units 12 for detecting pattern densities in a plurality of places on the photosensitive belt.

In the laser scanner unit 11, disposed are a horizontal synchronizing signal detector 18, a pattern generator circuit 4, a clock generator circuit 5, a laser driver 6, an image memory 7, and a laser scanner 8 having a laser. Each of the plurality of reflection density sensor units 12 contains a reflection density sensor 1, an amplifier 2, an A/D converter 3.

The horizontal synchronizing signal detector 18 detects a start of laser scanning. The pattern generator circuit 4 generates an image pattern for the detection of printing positional deviation by using a horizontal synchronizing signal pulse outputted from the horizontal synchronizing signal detector 18 as a reference. The laser driver 6 drives the laser scanner 8 having the laser based on an image signal outputted from the pattern generator circuit 4 for the detection of printing positional deviation in synchronization with the clock generator circuit 5.

In each of the reflection density sensor units 12, the reflection density sensor 1 detects a printing positional deviation detecting pattern formed on the photosensitive belt 10 as a difference in densities. The detected signal is amplified by the amplifier 2, then converted from analog to digital data by the A/D converter 3, and inputted to the CPU 9.

In the CPU 9, based on a signal from the reflection density sensor 1, the quantity $\Delta X$ of positional deviation of each color with respect to the printing pattern of a reference color is calculated. For a main scanning direction, the frequency f' of a clock to be outputted from the clock generator circuit 5 is calculated. Also, for a sub-scanning direction, a main scanning start timing is calculated. Then, these values are set in the clock generator circuit 5. The image memory 7 outputs image data according to a clock outputted from the clock generator circuit 5. Based on this data, the laser scanner 8 having the laser is driven by the laser driver 6. An image is formed as a latent image on the photosensitive body, development of each color is performed, and thus, an image having no printing positional deviation among colors is formed.

Figure 2:
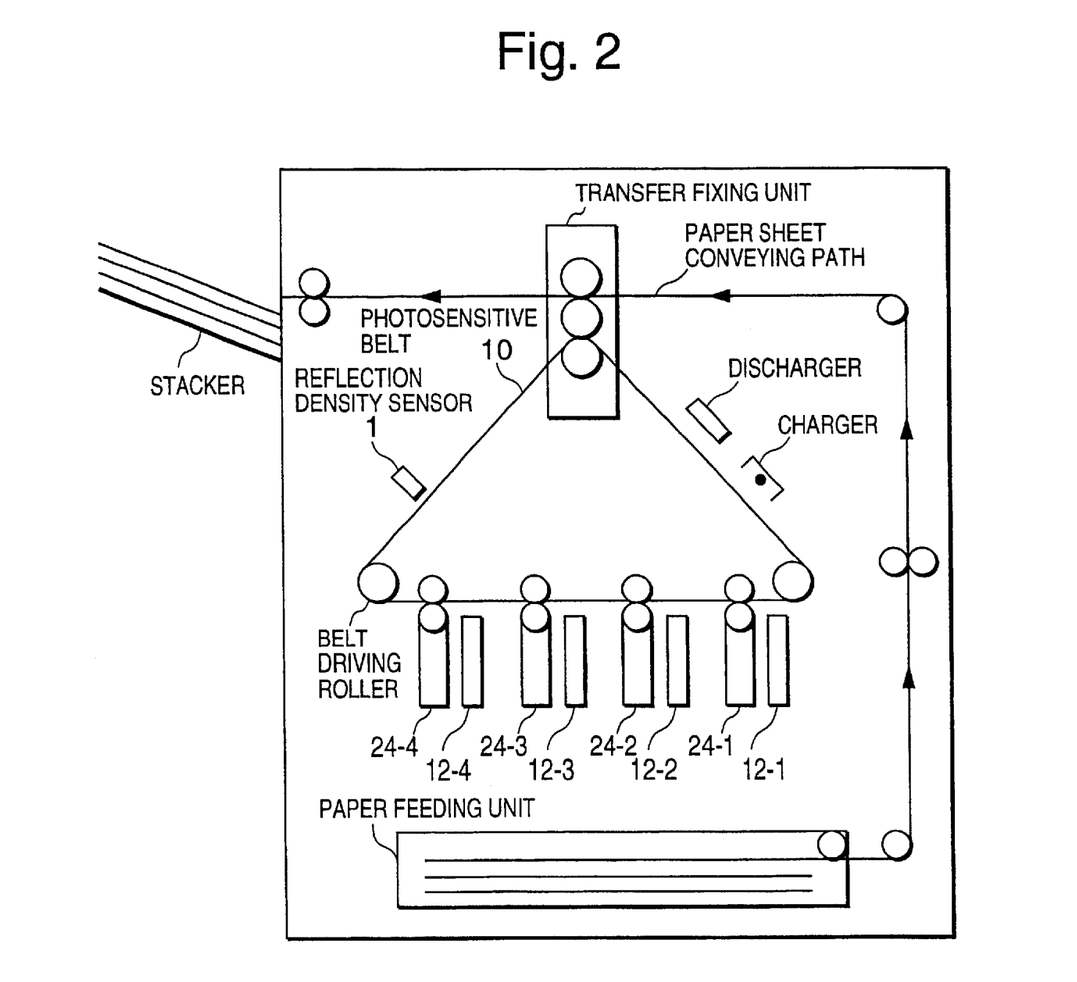
FIG. 2 is a sectional view showing an entire constitution of photosensitive, developing and transfer systems in the color image forming apparatus of the first embodiment.

Now, the attaching position of the reflection density sensor will be described with reference to FIGS. 2 and 3. FIG. 2 is a sectional view showing an entire constitution of photosensitive, developing and transfer systems in the color image forming apparatus; and FIG. 3 a view showing a positional relation between the photosensitive belt 10 and each of the reflection density sensor units 12 for detecting a printing density on the belt.

In FIG. 2, the reflection density sensor 1 is located close to the photosensitive belt 10, where the sensor 1 can detect the reflection density of this image after the image-formation of an image pattern for the detection of printing positional deviation among four colors.

Figure 3:
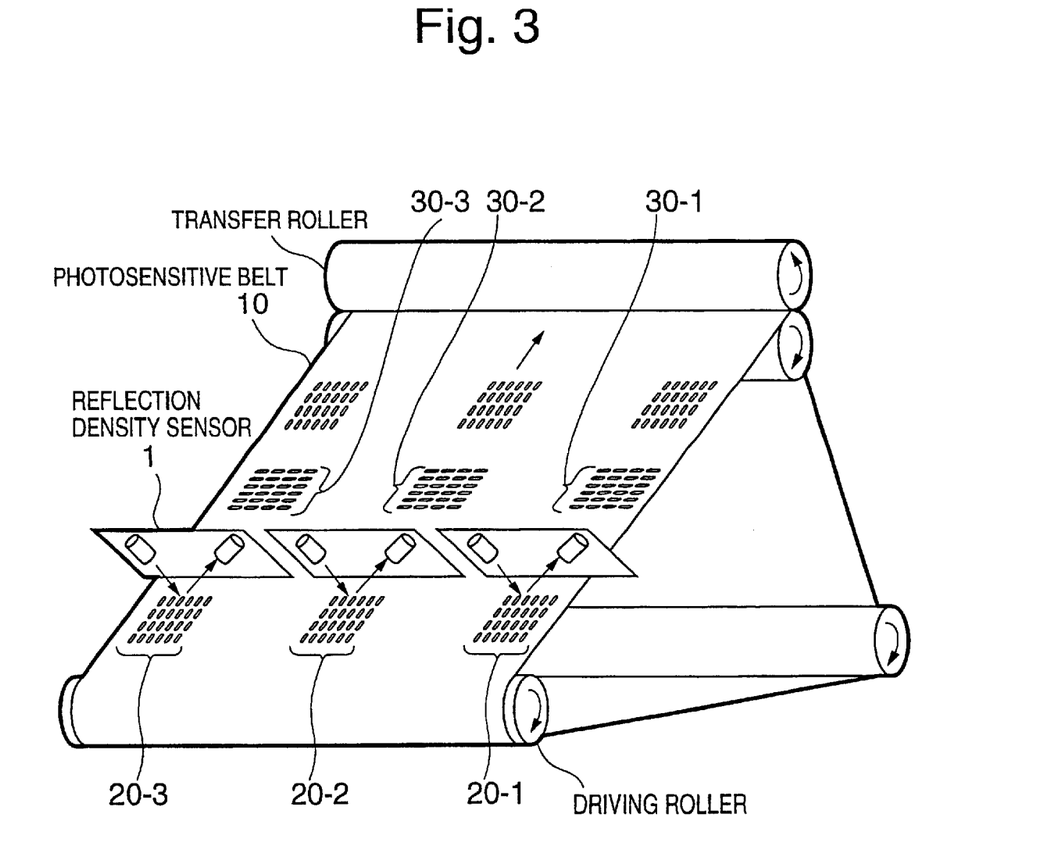
FIG. 3 is a view showing a positional relation between a photosensitive belt and a reflection density sensor unit for detecting a printing density on the belt in the color image forming apparatus of the first embodiment.

In addition, with regard to a positional relation with the photosensitive belt 10, as shown in FIG. 3, the reflection density sensors 1 are disposed in three places near a scanning start position, near a scanning central position and near a scanning end position along a laser scanning direction. Also, for each unit, the amplifier 2 and the A/D converter 3 are disposed in connection with the reflection density sensors 1.

Figure 4:
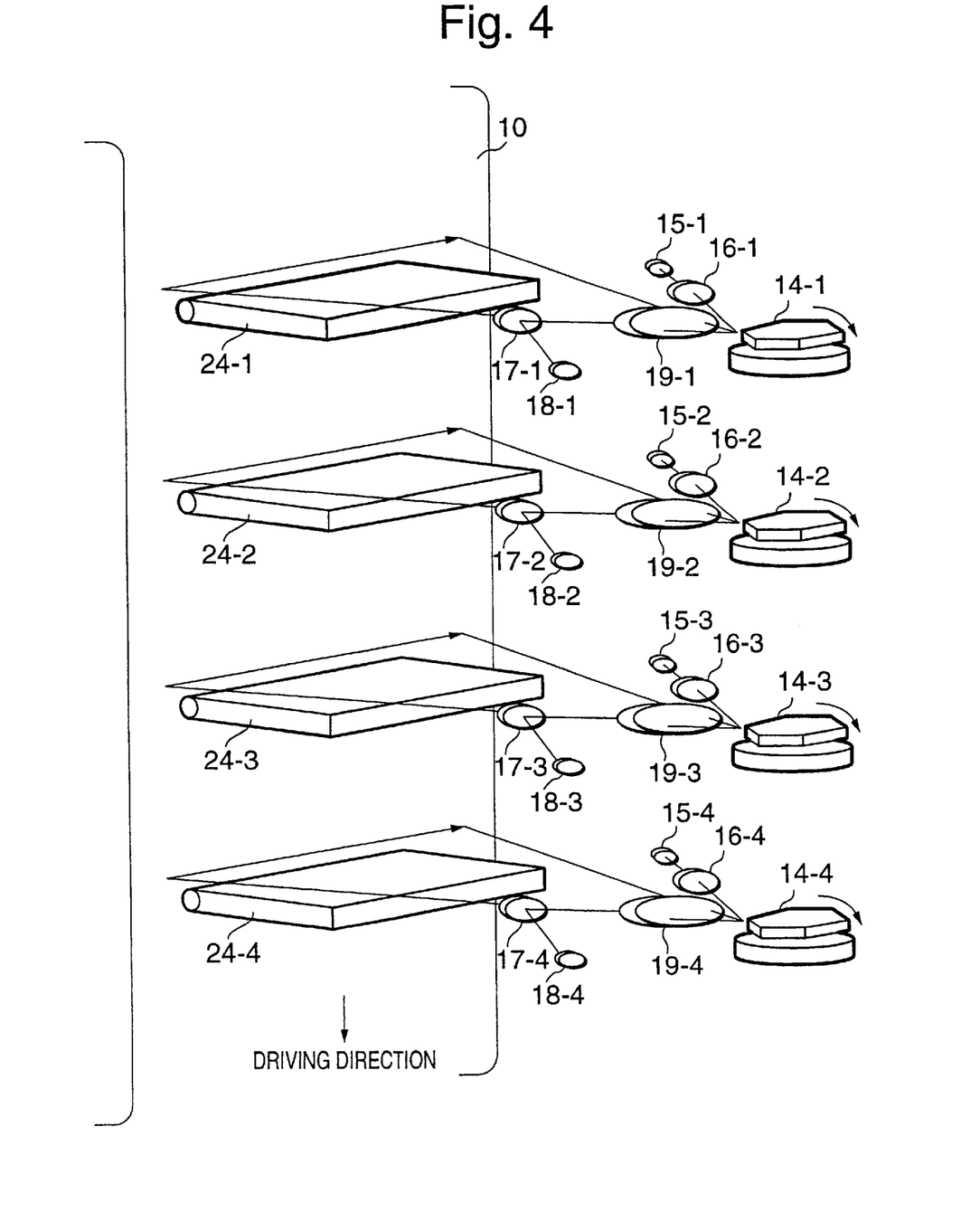
FIG. 4 is a view illustrating the arrangement of the photosensitive belt, a four-color laser scanner unit, and a developing device in the color image forming apparatus of the first embodiment.

Now, the arrangement of the photosensitive belt 10, four-color laser scanner units 11-1 to 11-4 and developing devices 24-1 to 24-4 will be described.

Lasers 15-1 to 15-4, collimating lenses 16-1 to 16-4, polygon mirrors 14-1 to 14-4, fθ lenses 19-1 to 19-4, mirrors 17-1 to 17-4, and horizontal synchronizing signal detectors 18-1 to 18-4 for the respective colors are arranged as laser scanner units 11-1 to 11-4 for the respective colors in casings similar among the respective colors.

Laser beams from lasers 8-1 to 8-4 for the respective colors are converted into parallel lights by the collimating lenses 16-1 to 16-4, then reflected and deflected by the rotating polygon mirrors 14-1 to 14-4 for the respective colors, and then converged and scanned on the photosensitive belt 10 through the fθ lenses 19-1 to 19-4. Laser lights immediately before the start of scanning onto the photosensitive belt 10 are reflected by the mirrors 17-1 and 17-4, and inputted to the horizontal synchronizing signal detectors 18-1 to 18-4. In addition, latent images of the images formed on the photosensitive belt 10 by the laser beam scanning of the respective colors are sequentially developed by the developing devices 24-1 to 24-4.

Figure 5:
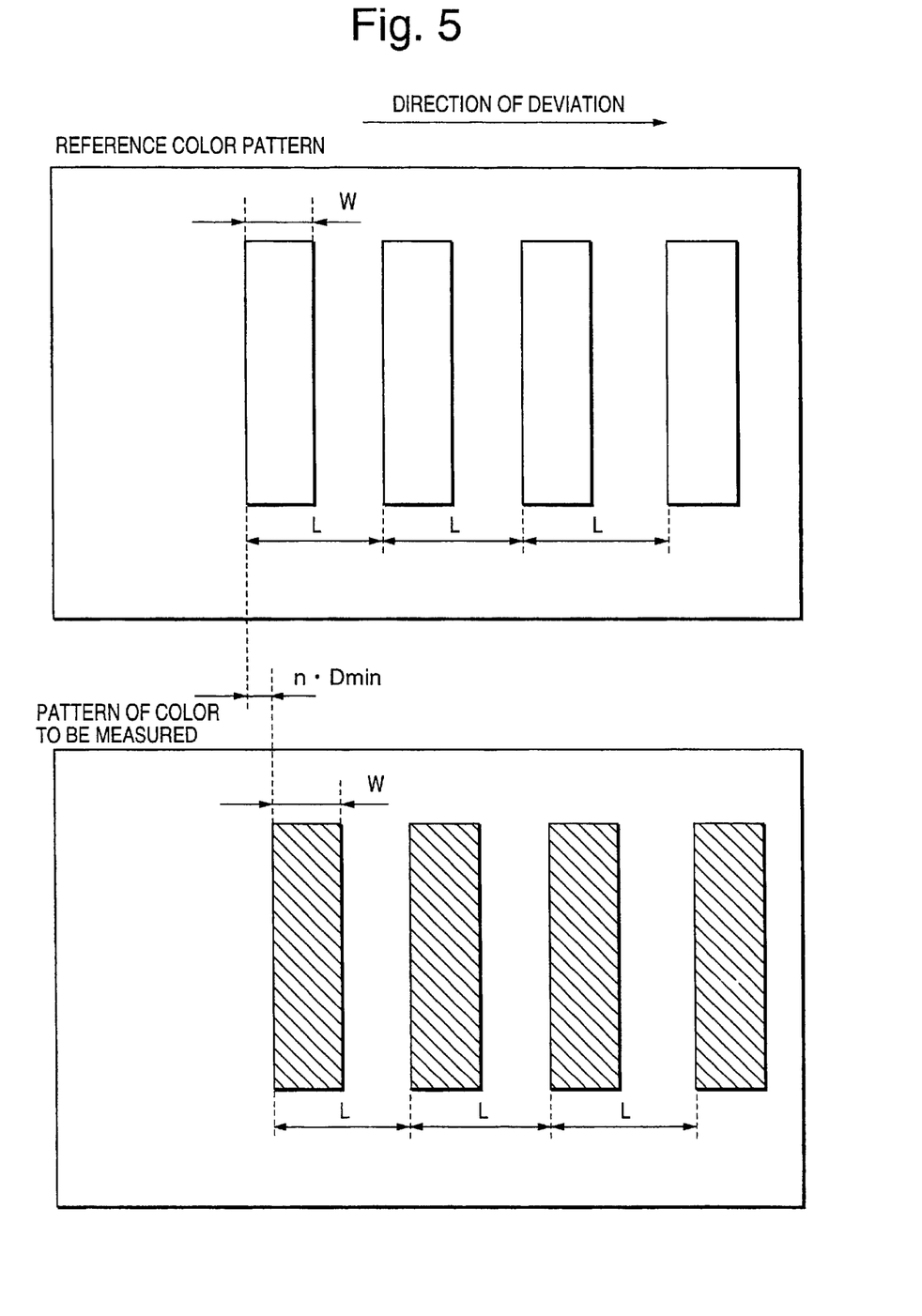
FIG. 5 is a view illustrating the shapes of a reference color pattern of an image pattern formed on the photosensitive belt to be used for detecting printing positional deviation and a color pattern to be measured in the color image forming apparatus of the first embodiment.
Figure 6:
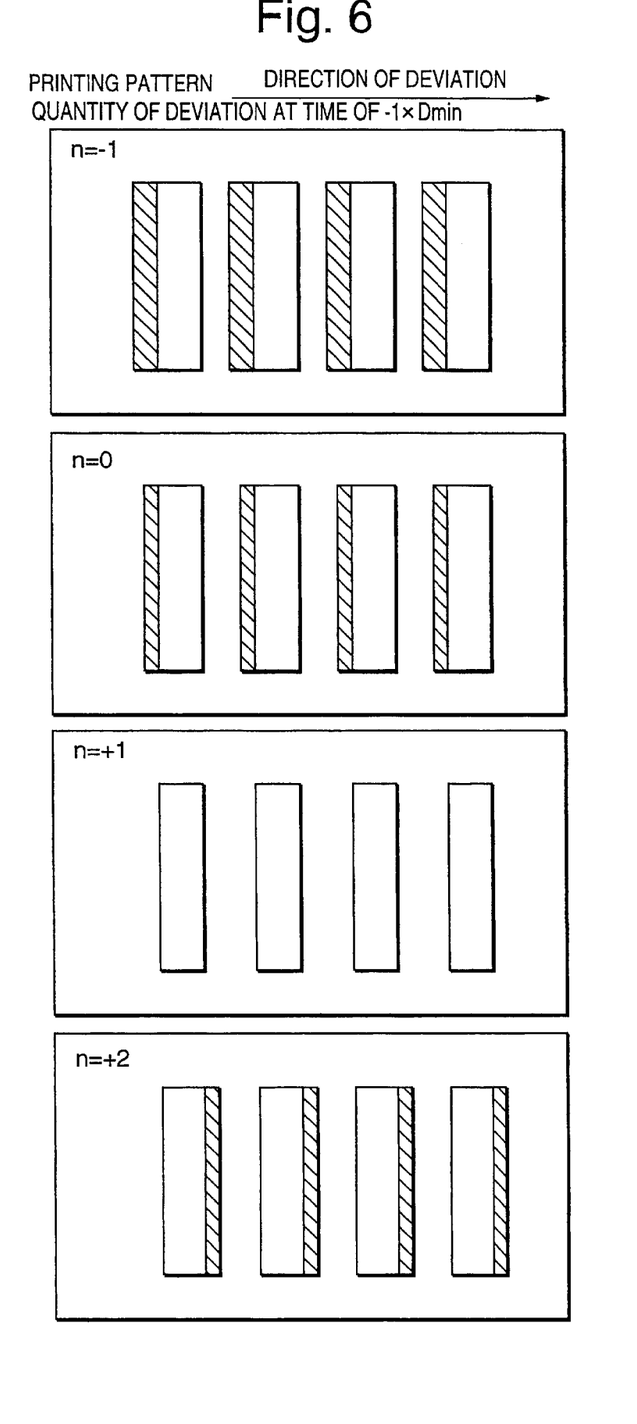
FIG. 6 is a view illustrating the quantity of deviation between a reference color pattern of an image pattern formed on the photosensitive belt to be used for detecting printing positional deviation and a color pattern to be measured, which is formed by adding positional deviation, in the color image forming apparatus of the first embodiment.

Now, an image pattern generated by the pattern generator circuit 4 for the detection of printing positional deviation will be described with reference to FIGS. 5 and 6. First, Dmax is defined as the maximum quantity of deviation to be detected; Dmin as the minimum quantity of deviation to be detected; W as a line width; L as a line interval; and n as an integer. As shown in FIG. 5, determination is made based on the result of printing by using a ruled line pattern orthogonal to the direction of deviation. To prevent a color pattern to be measured, which is printed by being superposed on a reference color pattern, from being superposed on an adjacent reference color pattern due to positional deviation, the following expression must be satisfied for a detecting pattern.

$$L \geq 2D\text{max} + D\text{min} \quad (1)$$

To enable the density sensor to detect a density within a wide dynamic range, it is only necessary to satisfy the following expression, where a line width is half a pattern cycle.

$$L = 2W \quad (2)$$

A pattern deviated beforehand by n·Dmin from the reference color pattern is printed with being superposed by the color to be measured, and −n·Dmin is considered as the quantity of deviation according to the deviation quantity of the color pattern to be measured when the reference color and the color to be measured are seen to superpose with each other. FIG. 6 shows the example of printing. When the color to be measured is shifted by n=+1 and recorded, the quantity of deviation between the reference color and the color to be measured can be understood to be −·Dmin because of the superposition of the two color patterns, which are the reference color and the color to be measured.

Thus, when the value of n for the color pattern to be measured, the superposed area of which is largest, is identified, the quantity of printing deviation of the color to be measured from the reference color can be understood to be −n·Dmin. To detect the superposed state of these two color patterns, the reflection density sensor is used.

Now, description will be made for the forming position of the image pattern on the photosensitive belt 10 for the detection of printing positional deviation shown in FIG. 6 and a pattern direction. Regarding the image pattern for the detection of printing positional deviation, image patterns 20-1 to 20-3 for the detection of printing positional deviation in the main scanning direction and image patterns 30-1 to 30-3 for the detection of printing positional deviation in the sub-scanning direction are formed. The respective patterns are provided in three places, i.e., the scanning start position (XX-1) of main scanning, a scanning central position (XX-2) and a scanning end position (XX-3) (XX represents a reference numeral 20 or 30). To detect the printing positional deviation of each color, each pattern is formed for each color to be measured. In FIG. 3, for example, reference numerals 20-1 to 20-3 denote patterns for the detection of printing positional deviation in the main scanning direction for cyan black; reference numerals 30-1 to 30-3 patterns for the detection of printing positional deviation in the sub-scanning direction for the same.

For the direction of a pattern arrangement, in the case of the patterns 20-1 to 20-3 for the detection of printing positional deviation in the main scanning direction, "the direction of deviation" indicated by an arrow in FIG. 3 is set corresponding to the horizontal width direction of the photosensitive belt 10. In other words, patterns of n=−1 to +2 in FIG. 3 are formed corresponding to the moving direction of the photosensitive belt. In addition, in the case of the patterns 30-1 to 30-3 for the detection of printing positional deviation in the sub-scanning direction, "the direction of deviation" indicated by an arrow shown in FIG. 3 is a corresponding to the moving direction of the photosensitive belt 10. In other words, patterns of n=−1 to +2 in FIG. 3 are formed corresponding to the horizontal width direction of the photosensitive belt. FIG. 3 shows a timing when the three reflection density sensors are about to start the detection of densities of the patterns 20-1 to 20-3 for the detection of printing positional deviation in the main scanning direction for the cyan black.

Each of the reflection density sensors is constituted of a light-emitting device such as an LED for irradiating a pattern developed on the photosensitive belt with an optical spot, and a photodetection device such as a phototransistor for receiving a reflected light from a light-emitting spot on the photosensitive belt. For the emitted light wavelength of the light-emitting device, since reflection spectral peaks are near 440 nm for yellow (Y), near 540 nm for magenta (M) and near 620 nm for cyan (C), a near-infrared wavelength separated from these peak wavelengths, absorbed by all kinds of toner and longer than near 800 nm may be used. The size of the light-emitting spot on the photosensitive belt has a large diameter of several mm such that a plurality of patterns for each n for the detection of printing positional deviation in FIG. 6 can be illuminated. The photodetection device receives a reflected light from the pattern, and subjects this light to photoelectric conversion. The CPU 9 of FIG. 1 detects a lowest density, that is, the photoelectric conversion level of the photodetection device, where a reflected light is maximum. The CPU 9 recognizes the n=+1 from the fact that the pattern of n=+1 of FIG. 6 having the reference colors and the color exactly superposed on each other provides a lowest density, that is, a maximum reflected light. Also, deviation ΔX between the reference color and the color to be measured is recognized to be −n·Dmin.

The foregoing detection of the quantity of printing positional deviation is different from one for detecting the absolute quantity of deviation by using a very small light-emitting spot, and designed to detect the average quantity of a reflected light from a large light-emitting spot covering the plurality of patterns, and detect not the quantity of deviation itself but a discrete integral value n. Thus, for the spot for irradiation on the photosensitive belt, it is not necessary to form a very small spot like that described in Patent Laid-Open Hei 11 (1999)-157134 of the foregoing related art for detecting the absolute quantity of deviation with high resolution. Therefore, the necessity of special condensing and image forming optical systems can be eliminated, optical constitution and adjustment can be extremely facilitated, and redundancy can be provided even to positional deviation.

Now, an operation will be described with reference to the timing charts of FIGS. 1 and 7. First, of the two scanning directions, i.e., main and sub-directions, the operation of the main scanning direction will be described.

The operation includes measuring and printing operations.

First, the measuring operation will be described. From the CPU 9, the initial value f(t) of an oscillation frequency is set beforehand in the clock generator circuit 5. In this case, t is set based on time t=0 for the passage of a laser beam through the horizontal synchronizing signal detector 18. The photosensitive belt is driven and, based on the setting from the CPU 9, the clock generator circuit 5 generates a clock of a frequency f(t) according to the time t. The pattern generator circuit 4 outputs an image pattern for the detection of the quantity of printing positional deviation in synchronization with the clock outputted from the clock generator circuit 5. Patterns outputted at this time are, as shown in FIG. 5, formed at a fixed cycle (cycle interval L) without any dependence on n for the reference color. For the color to be measured, patterns with the values of n therein continuously changed are formed so as to be sequentially arrayed in the sub-scanning direction, that is, in the belt driving direction, and in three places near a scanning start position, a scanning central position and a scanning end position in the main scanning direction, that is, in the laser scanning direction. A color pattern to be measured, which is image-formed by being superposed on the reference color, is only one color, and three color patterns are outputted in sequence. In other words, when the reference color is black, a cyan pattern is superposed on the black pattern, then a magenta pattern on the black pattern, and the like. These latent image patterns are developed by the developing device. Each of the developed patterns for the detection of printing positional deviation on the photosensitive belt is passed through a portion where the reflection density sensor 1 is attached. A density at this time is detected by the reflection density sensor 1, amplified by the amplifier 2, converted from an analog signal into a digital signal by the A/D converter 3, and then read by the CPU 9. From the time when a pattern having a lowest density (high reflectance) passes through the reflection density sensor 1 in the group of the patterns having different n values shown in FIG. 5, an n value at this time is obtained, and the quantity of deviation −n·Dmin from the reference color is obtained. This quantity of deviation from the reference color is measured at the three places including the width direction central portion and both ends of the photosensitive belt. A similar operation is carried out for the other two colors to be measured.

The n value is an integer, and the minimum value of the pre-determined quantity of pattern deviation is 1 Dmin. Accordingly, to obtain higher resolution, interpolation may be carried out by, for example obtaining an approximate function of a least square method based on a density value at each n.

Also, without any development carried out for each color, black may be set as a fourth color to be developed, and one color may be developed by using only the fourth developing device with black set as a reference color. In this way, the contrast of a detected density signal can be increased to enhance measuring accuracy.

In the foregoing manner, the measuring operation is completed.

Next, description will be made of the printing operation carried out by correcting a clock cycle in the main scanning direction so as to correct the printing positional deviation in the same direction based on the quantity of printing positional deviation obtained by the foregoing measuring operation. As described above in the section of related art, printing positional deviation is primarily caused by variance in laser beam scanning velocities on the photosensitive belt among colors in the main scanning direction. Such variance occurs because of fluctuation in the distance between the laser scanner unit and the photosensitive belt or in the laser scanning width, which is caused by attaching errors of a subassembly such as a photosensitive belt or the laser scanner unit or of components constituting the subassembly, temperature fluctuation, and the like. In addition, generally, a change occurs in the scanning velocity because of shifted uniform-velocity scanning, and depending on a scanning position within one scanning operation.

In the block diagram of FIG. 1 showing the entire constitution, the CPU 9 obtains a laser scanning velocity V'(t) on the photosensitive belt when the photosensitive belt is located in a shifted position. This calculation is carried out based on the following factors: the quantity of printing positional deviation of the color to be measured near the scanning start position from the printing position of the reference color, the quantity of deviation near the scanning central portion, the quantity of deviation near the scanning end position, and a laser scanning velocity V(t) on the photosensitive belt, when the photosensitive belt is located in an ideal position obtained based on a pre-determined designing or measuring value. A similar operation is carried out for the other two colors to be measured.

A distance 1/ρ between recording pixels in the main scanning direction is obtained by dividing a laser scanning velocity by a pixel clock cycle. Accordingly, when the laser scanning velocity is changed from V(t) to V'(t), by changing a pixel clock from f(t) to f'(t) based on a proportional relation represented by the following expression (3), the distance between the recording pixels can be returned to the distance when the photosensitive belt is located in the ideal position.

$$f'(t)=f(t)\cdot v'(t)/v(t) \tag{3}$$

The CPU 9 calculates f'(t) based on the expression (3), and sets the value obtained thereby in the clock generator circuit 5. The image memory 7 outputs image data according to a pixel clock outputted from the clock generator circuit 5. Then, based on this image data, the laser scanner 8 is driven, and latent images are formed on the photosensitive belt. These latent images are sequentially developed by the developing devices 24-1 to 24-4.

The distance 1/ρ between the pixels in the main scanning direction when the photosensitive belt is located in the ideal position is represented by 1/ρ=V(t)/f(t) as described above. However, even when the photosensitive belt is shifted in position to change the main scanning velocity to V'(t), by setting a new pixel clock frequency f'(t) satisfying the relation of the expression (3), an inter-pixel distance equal to the foregoing can be obtained as represented by the following expression (4).

$$v'(t)/f'(t)=v(t)/f(t)=1/\rho \tag{4}$$

By carrying out the foregoing operation for each color, even if there is a difference in laser beam scanning velocities among colors on the photosensitive belt, which is caused by variance in distances between the laser scanner unit and the photosensitive belt among colors due to attaching errors, temperature fluctuation, and the like, desired image data can be formed in a desired position on the photosensitive belt without any color shifting.

The measuring and printing operations for the printing positional deviation of the main scanning direction have been described. For the sub-scanning direction, an image pattern 30 formed on the photosensitive belt for the detection of printing positional deviation in the sub-scanning direction like that shown in FIG. 3 is measured to measure the printing deviation thereof by the reflection density sensor, the CPU 9 calculates a main scanning start timing for each color, and the value of each color is set in the clock generator circuit 5. Accordingly, color shifting in the sub-scanning direction can be prevented.

The propriety of the foregoing method according to the present invention for correcting the printing positional deviation in the main scanning direction depends on an algorithm for generating a new pixel clock f'(t). Now, a method for calculating f'(t) of the expression (3) will be described in detail. FIG. 7 is a view showing, for one color, a geometrical relation between a change in a laser scanning velocity and printing positional deviation when a distance between the laser scanner unit and the photosensitive belt is shifted from an ideal position 100 to a position 200, in other words a pan view of FIG. 4.

Figure 7:
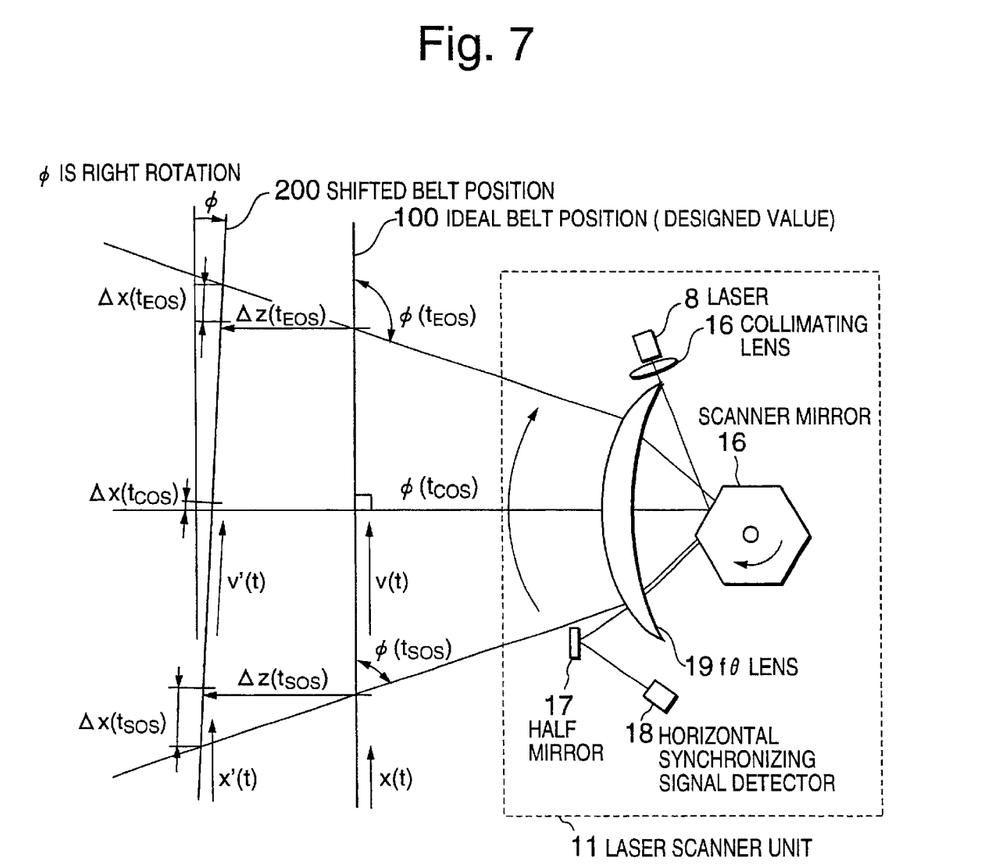
FIG. 7 is a plan view showing a geometrical relation between a change in a laser scanning velocity and printing positional deviation with regard to one color when a distance between the laser scanner unit and the photosensitive belt is shifted from an ideal position.

To obtain a laser scanning velocity V'(t) when the position of the photosensitive belt is shifted from its ideal position 100 to the position 200, as shown in FIG. 7, belt shifted distances $\Delta Z(tSOS)$ and $\Delta Z(tEOS)$ are obtained, and then X'(t) is obtained by the following procedure.

First, as a known parameter, a laser scanning velocity V(t) when the photosensitive belt is located in the ideal position 100 is measured for each laser scanner unit, and the incident angle $\phi(t)$ on the photosensitive belt 10 at this time is also known. In addition, the scanning position of a laser beam on the photosensitive belt 10 when the belt 10 is located in the ideal position can be obtained by the following expression with the virtual position of X(t=0)=0 used as a reference.

$$x(t) = \int_0^t v(\tau) d\tau \tag{5}$$

In the process of the foregoing measuring operation for measuring the quantity of printing positional deviation, the quantities of printing positional deviation of the color to be measured obtained by the reflection density sensor near the scanning start position, near the central portion and near the scanning end position from the printing position of the reference color respectively correspond to $\Delta X(tSOS)$, $\Delta X(tSOS)$, and $\Delta X(tEOS)$ in FIG. 7. Accordingly, $\Delta Z(tSOS)$ and $\Delta Z(tEOS)$ can be obtained by the following expressions (6) and (7).

$$\Delta z(t_{SOS}) = (\Delta x(t_{SOS}) - \Delta x(t_{COS})) \cdot (\sin\phi - \cos\phi \tan\phi(t_{SOS})) \tag{6}$$

$$\Delta z(t_{EOS}) = (\Delta X(t_{EOS}) - \Delta X(t_{COS})) \cdot (\sin\phi - \cos\phi \tan\phi(t_{EOS})) \tag{7}$$

In this case, $\phi(tSOS)$ and $\phi(tEOS)$ respectively represent the incident angles of a laser beam in the scanning start and end positions on the photosensitive belt 10 when the photosensitive belt is located in the ideal position 100. In addition, $\phi$ represents angular deviation of the photosensitive belt, and is given by the following expression.

$$\varphi = -\tan^{-1}\left[\frac{\Delta z(t_{EOS}) - \Delta z(t_{SOS})}{x(t_{EOS}) - x(t_{SOS})}\right] \tag{8}$$

To accurately obtain the shifted amounts $\Delta Z(tSOS)$ and $\Delta Z(tEOS)$ and the angular shifted amount $\phi$ of the photosensitive belt, sequential substitution may be repeated several times, which substitutes $\phi$ obtained by the expression (8) into the expressions (6) and (7) by using the value of $\phi=0$ as a first approximate value in the expressions (6) and (7). However, if $\phi$ is substantially small, the first approximate value can be directly used, and $\phi=0$ can be set in expressions thereafter. Determination thereof depends on the result of calculation made by using specific numerical values.

The quantity of deviation $\Delta Z(t)$ in a z direction at optional scanning time can be represented by the following expression.

$$\Delta z(t) = \frac{\Delta z(t_{EOS}) - \Delta z(t_{SOS})}{x(t_{EOS}) - x(t_{SOS})} \cdot [x(t) - x(t_{SOS})] + \Delta z(t_{SOS}) \tag{9}$$

The scanning position X'(t) of a laser beam on the photosensitive belt when the belt is shifted in position can be represented by the following expression with the virtual position of X'(t=0)=0 set as a reference.

$$x'(t) = x(t) + \frac{\Delta z(t)}{\sin\varphi - \cos\varphi\tan[\phi(t)]} + \Delta x(t_{\cos}) \cdot U(t) \tag{10}$$

Here, $$U(t) = 0 \quad (t \leq 0) \tag{11}$$
$$= 1 \quad (t > 0)$$

From the expression (10), V'(t) can be obtained as follows.

$$v'(t) = \frac{d}{dt}x'(t) \tag{12}$$
$$= \frac{d}{dt}x(t) + \frac{d}{dt} \cdot \frac{\Delta z(t)}{\sin\varphi - \cos\varphi\tan[\phi(t)]} + \frac{d}{dt}\Delta x(t_{\cos}) \cdot U(t)$$
$$= v(t) + \frac{d}{dt} \cdot \frac{\Delta z(t)}{\sin\varphi - \cos\varphi\tan[\phi(t)]} + \Delta x(t_{\cos}) \cdot \delta(t)$$

Here, $\delta(t)$ represents a delta function.

However, this state is not practical. Thus, by defining t0 as time (0<t0<tSOS) when the laser beam is deviated from a drawing area and by $\phi$ (t0) as time capable to be defined, the expression (12) becomes as follows.

$$x'(t) = x(t) + \left\{\frac{\Delta z(t_0)}{\sin\varphi - \cos\varphi\tan[\phi(t_0)]} + \Delta x(t_{\cos})\right\} \cdot \frac{t}{t_0} \quad (0 \leq t \leq t_0) \tag{13}$$
$$= x(t) + \frac{\Delta z(t)}{\sin\varphi - \cos\varphi\tan[\phi(t)]} + \Delta x(t_{\cos}) \quad (t > t_0)$$

Then, from the expression (13), V'(t) becomes as follows.

$$v'(t) = v(t) + \left\{\frac{\Delta z(t_0)}{\sin\varphi - \cos\varphi\tan[\phi(t_0)]} + \Delta x(t_{\cos})\right\} \cdot \frac{1}{t_0} \quad (0 \leq t \leq t_0) \tag{14}$$

-continued $$= v(t) + \frac{d}{dt} \cdot \frac{\Delta z(t)}{\sin\varphi - \cos\varphi\tan[\phi(t)]} \qquad (t > t_0)$$

Accordingly, from each of the expressions (3), (4) and (14), f'(t) is obtained as follows.

$$f'(t) = f(t) + p \cdot \left\{ \frac{\Delta z(t_0)}{\sin\varphi - \cos\varphi\tan[\phi(t_0)]} + \Delta x(t_{\cos}) \right\} \cdot \frac{1}{t_0} \quad (0 \le t \le t_0) \qquad (15)$$

$$= f(t) + p \cdot \left\{ \frac{d}{dt} \cdot \frac{\Delta z(t_0)}{\sin\varphi - \cos\varphi\tan[\phi(t)]} \right\} \qquad (t > t_0)$$

Thus, from the quantity of printing positional deviation for each color, which has been measured by the reflection density sensor 1, the CPU 9, based on the foregoing expressions, immediately calculates a clock frequency f(t) corrected for each color, and sets it in the clock generator circuit 5. Then, based on the corrected clock which is outputted from the clock generator circuit 5, exposure by laser scanning, and subsequent development and transfer are carried out, and clear color laser image without any printing positional deviation is thereby formed.

Figure 8:
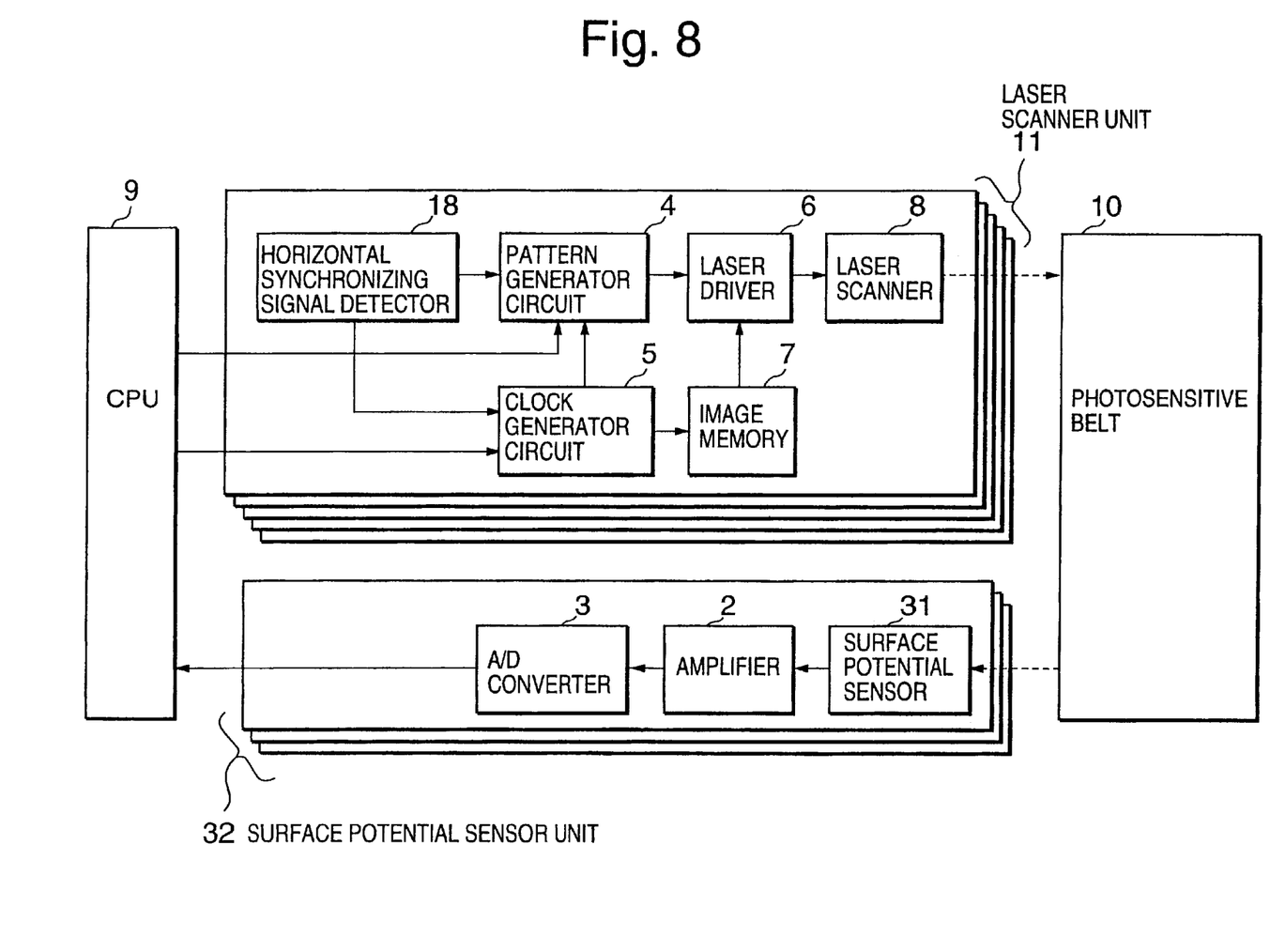
FIG. 8 is a block diagram showing an entire constitution of a color image forming apparatus according to a second embodiment of the present invention.

Next, the other embodiment of the invention will be described with reference to FIG. 8.

In the first embodiment, the quantity of printing positional deviation was measured by developing the pattern for the detection of printing positional deviation by each color or black only, and using the reflection density sensor to detect a density. In the second embodiment shown in FIG. 8, however, a surface potential sensor 11 is provided for the detection of printing positional deviation.

The surface potential sensor has already been commercially available, and widely used for a laser printer, various apparatuses using an electrostatic phenomenon, and in various industrial fields. An example of its constitution/principle may be the one that a tuning fork chopper is disposed between an electrode for detecting a surface potential on the surface of an object to be measured and the object and is driven by a piezoelectric device. This exemplary sensor is designed to measure the surface potential of the object to be measured by using the tuning fork chopper to modulate a charge amount induced in the detecting electrode from the object, and using a synchronizing signal to execute synchronous detection. The sensor is compact and capable of accurately measuring the surface potential of the object in non-contact.

When such a surface potential sensor is used, the pattern for the detection of the quantity of printing positional deviation is subjected to exposure but not to development. By detecting a latent image potential instead of an image density, the superposed state of image patterns is detected. Other than this sensor, the components, and the printing positional deviation detecting and correcting systems of the laser image forming apparatus are similar to those of the first embodiment.

Even when there is a difference in laser beam scanning velocities among colors on the photosensitive belt resulting from variance in distance between the laser scanner unit and the photosensitive belt, which is caused by attaching errors, temperature fluctuation, and the like, it is possible to form the latent image of desired image data in a desired position on the photosensitive belt. In other words, an image formed for each color by laser beam scanning and developed by the developing device is high in quality without any color shifting.

What is claimed is:

1. In a laser color image forming method for developing a latent image formed on an electrophotographic photosensitive belt by laser scanning having a fixed scanning frequency and a pixel forming clock frequency within one scanning by toner absorption, and then transferring the developed image to a printing medium, that is, a paper sheet, and in a method using a plurality of laser beams and a plurality of toner colors, a method for detecting the quantity of a laser scanning positional deviation on said photosensitive belt, comprising the steps of:

setting a plurality of zonal patterns formed by toner development on said photosensitive belt for optional one among a plurality of colors and arrayed on a fixed cycle as image patterns for detection of a printing positional deviation of a reference color, setting image patterns having shapes similar to those of said image patterns for the detection of the printing positional deviation of the reference color and designed for the detection of the printing positional deviation of other colors as image patterns for the detection of the printing positional deviation of a color to be measured, spatially shifting the image patterns for the detection of the printing positional deviation of the color to be measured from said image patterns for the detection of the printing positional deviation of the reference color, and varying said quantity of spatial shifting for each of said plurality of the image patterns for the detection of the printing positional deviation of the reference color, thus forming the image patterns in a superposed state on said photosensitive belt;

measuring reflection densities of the plurality of the image patterns formed in the superposed state for the detection of the printing positional deviation;

detecting a group having said minimum reflection densities among the plurality of said image patterns formed in the superposed state for the detection of the printing positional deviation; and detecting the quantity of the deviation between a laser scanning position of the reference color and a laser scanning position of the color to be measured based on the quantity of shifting given when the detected group of the image patterns for the detection of the printing positional deviation is formed by being superposed on the color to be measured.

2. The method according to claim 1, wherein said image patterns for the detection of the printing positional deviation of the reference color and of the color to be measured are formed in three places, that is, a scanning start end portion, a scanning central portion and a scanning finish end portion of said laser scanning direction on said photosensitive belt.

3. The method according to claim 1, wherein said image patterns for the detection of the printing positional deviation of the reference color and the color to be measured are constituted of image patterns for detecting the printing positional deviation in said laser scanning direction on said photosensitive belt, and the printing positional deviation in a sub-scanning direction orthogonal to said laser scanning direction.

4. The method according to claim 1, wherein the number of said other colors is three, and the quantity of deviation from the laser scanning position of the reference color is detected for each of said three colors.

5. The method according to claim 1, wherein said three colors are all developed by a toner color similar to that for the reference color.

6. The method according to claim 1, wherein the measured reflection densities of said image patterns for the detection of the printing positional deviation are obtained from an irradiating light used to irradiate a plurality of zonal patterns arrayed on the fixed cycle constituting said image patterns for the detection of the printing positional deviation.

7. In a laser color image forming method for developing a latent image formed on an electrophotographic photosensitive belt by laser scanning having a fixed scanning frequency and a pixel forming clock frequency within one scanning by toner absorption, and then transferring the developed image to a printing medium, that is, a paper sheet, and in a method using a plurality of laser beams and a plurality of toner colors, a method for detecting the quantity of laser scanning positional deviation on said photosensitive belt, comprising the steps of:

setting a plurality of zonal latent image patterns formed on said photosensitive belt for optional one among a plurality of colors and arrayed on a fixed cycle as latent image patterns for detection of a printing positional deviation of a reference color, setting latent image patterns having shapes similar to those of said latent image patterns for the detection of the printing positional deviation of the reference color and designed for the detection of the printing positional deviation of other colors as image patterns for the detection of the printing positional deviation of a color to be measured, spatially shifting the image patterns for the detection of the positional deviation of the color to be measured from the latent images for the detection of the printing positional deviation of the reference color, and varying said quantity of spatial shifting for each of the plurality of latent image patterns for the detection of printing positional deviation of the reference color, thus forming the image and latent image patterns in a superposed state on said photosensitive belt;

measuring a surface potential of each of the plurality of latent image patterns formed in the superposed state;

detecting a group having minimum surface potentials among the latent image patterns formed in the superposed state for the detection of printing positional deviation; and detecting the quantity of deviation between a laser scanning position of the reference color and a laser scanning position of the color to be measured based on the quantity of shifting given when the detected group of latent image patterns for the detection of printing positional deviation is formed by being superposed on the color to be measured.

8. The method according to claim 7, wherein said latent image patterns for the detection of the printing positional deviation of the reference color and of the color to be measured are formed in three places, i.e., a scanning start end portion, a scanning central portion and a scanning finish end portion of said laser scanning direction on said photosensitive belt.

9. The method according to claim 7, wherein said latent image patterns for the detection of the printing positional deviation of the reference color and the color to be measured are constituted of the latent image patterns for detecting the printing positional deviation in said laser scanning direction on said photosensitive belt, and the latent image patterns for detecting the printing positional deviation in a sub-scanning direction orthogonal to said laser scanning direction.

10. The method according to claim 7, wherein the measured surface potentials of said latent image patterns for the detection of printing positional deviation are obtained from the plurality of zonal patterns constituting said latent image patterns for the detection of printing positional deviation and arrayed on the fixed cycle.

11. A method for correcting a laser scanning positional deviation on a photosensitive belt, adapted to correct the laser scanning positional deviation by changing a scanning start timing of said laser scanning and said pixel forming clock frequency according to the quantity of the positional deviation detected by the laser scanning positional deviation detecting method specified in claim 1.

12. A laser color image forming apparatus using a plurality of laser beams and a plurality of toner colors, comprising:

an electrophotographic photosensitive body;

means for forming a latent image on the photosensitive belt by laser scanning having a fixed scanning frequency and a pixel forming clock frequency within one scanning;

means for developing the latent image on the photosensitive belt by toner absorption;

means for transferring the developed image to a printing medium, such as, a paper sheet;

means for forming image patterns for detection of a printing positional deviation of a reference color, the image patterns including zonal patterns formed by toner development on said photosensitive belt for optional one among a plurality of colors and arrayed on a fixed cycle in a laser scanning direction, which are set as a plurality of image patterns for detection of main scanning direction printing positional deviation in a direction orthogonal to said laser scanning direction, and zonal patterns arrayed on a fixed cycle in the direction orthogonal to said laser scanning direction, which are set a plurality of image patterns for detection of sub-scanning direction printing positional deviation in the laser scanning direction;

means for setting image patterns having shapes similar to those of said image patterns for the detection of the printing positional deviation of the reference color and designed for the detection of the printing positional deviation of other colors as image patterns for detection of printing positional deviation of a color to be measured, spatially shifting said image patterns for the detection of the printing positional deviation of the color to be measured from the image patterns for the detection of printing positional deviation of the reference color, that is, the image patterns for the detection of main scanning direction printing positional deviation in the main scanning direction, and the image patterns for the detection of sub-scanning direction printing positional deviation in the sub-scanning direction respectively, varying the quantity of spatial shifting for each of the plurality of image patterns for the detection of the printing positional deviation of the reference color, and then forming the image patterns in a superposed state on said photosensitive belt;

means for measuring reflection densities of the plurality of image patterns for the detection of the printing positional deviation formed in the superposed state;

laser scanning position detecting means for detecting a group having said minimum reflection densities among the plurality of said image patterns formed in the superposed state for the detection of printing positional deviation, and detecting the quantity of deviation between a laser scanning position of the reference color and a laser scanning position of the color to be measured based on the quantity of shifting given when the detected group of image patterns for the detection of printing positional deviation is formed by being superposed on the color to be measured; and means for changing, to correct the positional deviation of laser scanning on said photosensitive belt among images of a plurality of colors, a scanning start timing of the laser scanning according to said quantity of the sub-scanning direction positional deviation detected by the laser scanning positional deviation detecting means, and said pixel forming clock frequency according to the quantity of the main direction positional deviation detected by said laser scanning positional deviation detecting means.

13. The laser color image forming apparatus according to claim 12, wherein said image patterns for the detection of the printing positional deviation of the reference color and the color to be measured are formed in three places on said photosensitive belt, that is, a scanning start end portion, a scanning central portion and a scanning finish end portion of the laser scanning direction.

14. The laser color image forming apparatus according to claim 12, wherein the number of said other colors is three, and the quantity of deviation from the laser scanning position of the reference color is detected for each of said three colors.

15. The laser color image forming apparatus according to claim 14, wherein said three colors are all developed by a toner color similar to that of the reference color.

16. The laser color image forming apparatus according to claim 12, wherein the reflection densities of the image patterns for the detection of printing positional deviation measured by said reflection density measuring means are obtained from an irradiation light used to irradiate the plurality of zonal patterns arrayed on the fixed cycle constituting said image patterns for the detection of printing positional deviation.

17. A laser color image forming apparatus using a plurality of laser beams and a plurality of toner colors, comprising:

an electrophotographic photosensitive body;

means for forming a latent image on the photosensitive belt by laser scanning having a fixed scanning frequency and a pixel forming clock frequency within one scanning;

means for developing the latent image on the photosensitive belt by toner absorption;

means for transferring the developed image to a printing medium, such as, a paper sheet;

means for forming latent image patterns for detection of a printing positional deviation of a reference color, the image patterns including zonal latent image patterns formed on said photosensitive belt for optional one of a plurality of colors and arrayed on a fixed cycle in a laser scanning direction, which are set as a plurality of latent image patterns for detection of main scanning direction printing positional deviation in a direction orthogonal to said laser scanning direction, and zonal latent image patterns arrayed on a fixed cycle in the direction orthogonal to said laser scanning direction, which are set as a plurality of patent image patterns for detection of sub-scanning direction printing positional deviation in the laser scanning direction;

means for setting latent image patterns having shapes similar to those of said latent image patterns for the detection of printing positional deviation of the reference color and designed for detection of printing positional deviation of other colors as latent image patterns for the detection of the printing positional deviation of a color to be measured, spatially shifting said latent image patterns for the detection of the printing positional deviation of the color to be measured from the latent image patterns for the detection of the printing positional deviation of the reference color, that is, the latent image patterns for the detection of main scanning direction printing positional deviation in a main scanning direction, and the latent image patterns for the detection of sub-scanning direction printing positional deviation in a sub-scanning direction, varying the quantity of spatial shifting for each of the plurality of latent image patterns for the detection of the printing positional deviation of the reference color, and then forming the image patterns in a superposed state on said photosensitive belt;

means for measuring surface potentials of the plurality of latent image patterns for the detection of the printing positional deviation formed in the superposed state;

laser scanning position detecting means for detecting a group having said minimum surface potentials among the latent image patterns for the detection of the printing positional deviation formed in the superposed state, and detecting the quantity of deviation between a laser scanning position of the reference color and a laser scanning position of the color to be measured based on the quantity of shifting given when the detected group of latent image patterns for the detection of the printing positional deviation is formed by being superposed on the color to be measured; and means for changing, to correct the positional deviation of laser scanning on said photosensitive belt among images of a plurality of colors, a scanning start timing of the laser scanning according to the quantity of the sub-scanning direction positional deviation detected by the laser scanning positional deviation detecting means, and the pixel forming clock frequency according to the quantity of the main scanning direction positional deviation detected by the laser scanning positional deviation detecting means.

18. The laser color image forming apparatus according to claim 17, wherein said latent image patterns for the detection of the printing positional deviation of the reference color and the color to be measured are formed in three places on the photosensitive belt, that is, a scanning start end portion, a scanning central portion and a scanning finish end portion of the laser scanning direction.

19. The laser color image forming apparatus according to claim 17, wherein the number of said ther colors is three, and the quantity of deviation from a laser scanning position of the reference color is detected for each of said three colors.

20. The laser color image forming apparatus according to claim 17, wherein the surface potentials of said latent image patterns for the detection of printing positional deviation detected by the surface potential measuring means are obtained from the plurality of zonal patterns arrayed on the fixed cycle constituting said latent image patterns for the detection of printing positional deviation.

* * * * *